United States Patent [19]

Hecht et al.

[11] Patent Number: 5,372,040

[45] Date of Patent: Dec. 13, 1994

[54] MEASURING ELEMENT FOR THE ASPIRATED AIR OF AN INTERNAL COMBUSTION ENGINE

[75] Inventors: Hans Hecht, Korntal; Theodor-Armin Hoffacker, Lauffen; Dieter Schramm, Stuttgart; Armo Altpeter, Sindelfingen, all of Germany

[73] Assignee: Robert Bosch GmbH, Stuttgart, Germany

[21] Appl. No.: 982,331

[22] Filed: Nov. 27, 1992

[30] Foreign Application Priority Data

Nov. 30, 1991 [DE] Germany ............... 4139631

[51] Int. Cl.⁵ .................................. G01F 1/68
[52] U.S. Cl. .......................... 73/204.26; 73/118.2
[58] Field of Search ............ 73/204.26, 204.16, 204.23, 73/204.25, 118.2

[56] References Cited

U.S. PATENT DOCUMENTS 4,777,820 10/1988 Hecht et al. .................. 73/204.26
4,976,145 12/1990 Kienzle et al. ................ 73/204.26

FOREIGN PATENT DOCUMENTS 3638138 11/1988 Germany.

OTHER PUBLICATIONS

Technische Mechanik, Dr. Guenther Holzmann et al, (1975) pp. 41–43.

*Primary Examiner*—Richard E. Chilcot, Jr.
*Assistant Examiner*—Harshad Patel
*Attorney, Agent, or Firm*—Edwin E. Griegg; Ronald E. Greigg

[57] ABSTRACT

A measuring element for determining the flow rate of the aspirated air of an internal combustion engine comprising a substrate, which is divided by two parallel separating slits of equal length into three prongs on which temperature-dependent resistor tracks are disposed. The measuring element has separating slits of optimized shape. To lessen the notch action and reduce tension peaks at the ends of the slits, one separating slit has a segment with a curved course, and another separating slit has a slit end embodied as an enlargement. The novel measuring element is especially suitable for determining the flow rate of the aspirated air in internal combustion engines.

10 Claims, 2 Drawing Sheets

MEASURING ELEMENT FOR THE ASPIRATED AIR OF AN INTERNAL COMBUSTION ENGINE

BACKGROUND OF THE INVENTION

The invention is based on a measuring element as defined hereinafter for a device for determining the mass of a flowing medium, in other words its flow rate for the aspirated air of internal combustion engines.

In such devices, also known as air flow rate meters, the resistor tracks of a temperature sensor and a compensation resistor on the one hand and the resistor track of the measuring resistor on the other, together with two balancing resistors, form a Wheatstone bridge, whose bridge diagonal voltage is applied to a control amplifier. The output voltage of the control amplifier serves as a heating voltage for a heating resistor of the measuring element.

In a measuring element of this generic type for the aforementioned device, known from DE 36 38 138 A1; U.S. Pat. No. 4,777,820, the distribution of the resistor tracks on a substrate is made such that the resistor tracks succeed one another in the flow direction and are parallel. The resistor track for the compensation resistor is disposed between the resistor track for the temperature sensor and the resistor track for the measuring resistor, on the same side of the substrate, and the resistor track for the heating resistor is disposed on the opposite side of the substrate, directly facing the resistor track for the measuring resistor. The various resistor tracks are separated from one another by slits in the substrate that extend transversely to the flow direction, thereby bringing about a temperature decoupling between the resistor tracks. As a result of these separating slits, the substrate has three prongs of equal length, of which the first two prongs in the flow direction each carry one resistor track, and the last prong in the flow direction carries the resistor track for the measuring resistor and the heating resistor.

Because of their notch action, the ends of the various separating slits located inside the substrate decrease the strength of the substrate at the base of the notch. Particularly in the region of the middle prong, whose clamping cross section on both sides is defined by one slit end each, the strength is severely reduced, especially under dynamic load. As a result of the notches, a force flux that is uniformly distributed without notch action is interfered with, in other words compressed or deflected. This creates tension concentrations at the base of the notch. Tension peaks develop in these regions that are markedly higher than the rated tension.

During the assembly and upon impacts transmitted by structure-borne sound, the various prongs of the measuring element are made to vibrate; especially when the natural frequency is reached, and in combination with the notch action at the base of the notch of the separating slits, the vibration causes considerable tension peaks in the region at the ends of the slits of the various prongs of the measuring element. If these tension peaks exceed the characteristic strength values for the material, they lead to cracks beginning at the end of the slit and may even lead to breakage of the substrate.

OBJECT AND SUMMARY OF THE INVENTION

The measuring element embodied according to the invention as defined herein has the advantage over the prior art that the tension peaks at the ends of separating slits of the substrate are lessened in a simple way. The strength of the substrate of a measuring element, especially under dynamic load, is increased. The increased long-term strength of the substrate lengthens the service life of the measuring element.

A particularly advantageous feature of the invention is that a slit end is embodied in the form of an enlargement.

The vulnerability to breakage, particularly of a prong located between two separating slits, can be reduced considerably by providing a different length of the applicable separating slits.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
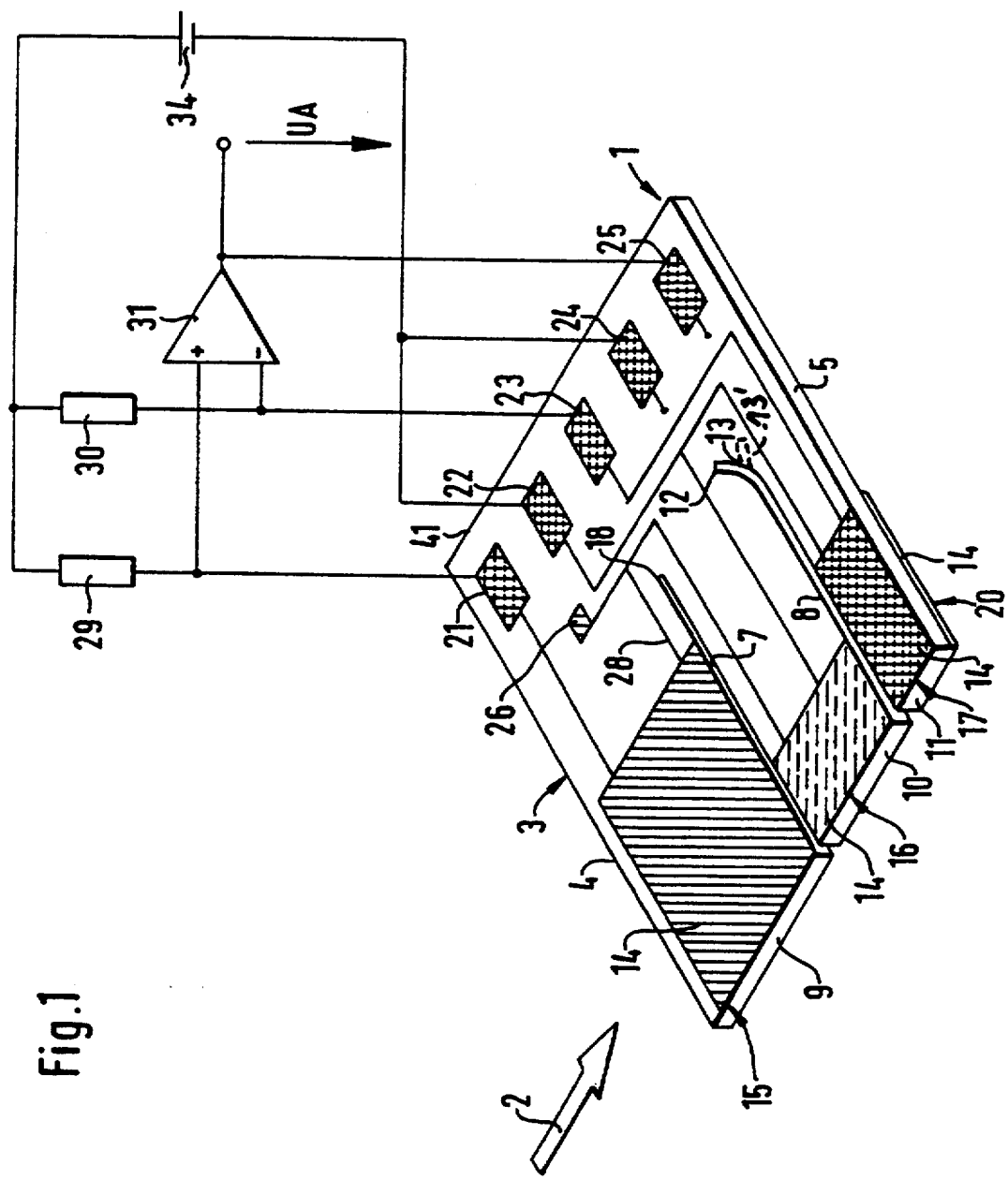
FIG. 1 shows a measuring element embodied in accordance with the invention in the form of a first exemplary embodiment of a flow rate meter.

A first exemplary embodiment of a flow rate meter, which is sketched in FIG. 1 as an example of a device for determining the mass, or flow rate, of the aspirated air of an internal combustion engine, has a measuring element 1 that projects into this flowing medium, in this case air, and in the case of internal combustion engines, for instance, is disposed in an air intake tube or in a bypass line belonging to the air intake tube. The flow direction of the fluid is indicated by an arrow 2. The measuring element 1 comprises a substrate 3 of rectangular shape, for instance, which is divided transversely to the flow direction into three prongs 9, 10, 11, for instance of equal length, by means of two separating slits 7, 8 extending parallel, for instance, to an upstream leading face 4 and a downstream trailing face 5. The separating slits 7, 8 may for instance be cut into the substrate 3 with a laser. Adjoining a slit end 12 located inside the substrate 3, the separating slit 8 that partly defines the last downstream prong 11 has a segment 13 that is curved in the direction of the other separating slit 7, or in other words has a curved course, for example. The end 12 of the separating slit 8 and one end 18 of the separating slit 7 are located at the same distance from a long side 41 of the substrate 3 located between the trailing face 5 and the leading face 4.

Unlike what is shown in FIG. 1 of the drawing and described above, a variant of the substrate 3 is also possible, for instance, in which the segment 13 of the separating slit 8 can have a curved course pointing away from the separating slit 7, or in other words a course toward the trailing face 5, as shown in dashed lines at 13'.

The ends 12, 18 of the separating slits 7, 8 form notches, structurally necessary for the substrate 3, in the region of which the uniform or linear voltage distribution is interfered with. As soon as the uniform course of the force is interrupted, an impedance voltage state develops in the immediate vicinity of the notches; this is superimposed on the voltages that in the unnotched body would be operative under the same load. The characteristic value here is the peak value that the highest primary tension at the interference point attains. At the bottom of the notch, which in the exemplary embodiment described is identical to the slit end 12 or 18, a maximum tension occurs, which depending on the sharpness of the notch is variably high above the rated tension that would occur in the unnotched component. The maximum tension occurring at the notch bottom is the most important variable for the strength of the component, in this case the substrate 3.

The mechanical load on the substrate 3 of the measuring element 1 from vibration and impacts originating in the engine, in combination with the notch action of the slit ends 12, 18, leads to tension peaks. If the tension peaks exceed the characteristic strength value for the material of the substrate 3—that is, its fatigue limit—then cracks arise, beginning at the notch bottom which, if the overload persists lead, to breakage of the substrate 3. The load of a clamping cross section of the middle prong 10, which is located between the slit ends 12, 18 of the separating slits 7, 8 and is thus threatened from both sides by the maximum tension occurring at the notch bottom, is especially unfavorable. By providing a curved course of segment 13 of the separating slit 8, the maximum tension that occurs at the notch bottom of the slit end 12 is kept low in comparison with a substrate of the prior art having a separating slit with a straight course.

One resistor track 14 is disposed on each of the prongs 9, 10, 11; the first prong 9 in the flow direction has the resistor track 14 for a temperature sensor 15, the second prong has the resistor track 14 for a compensation resistor 16, and the third prong 11 has a resistor track 14 for a measuring resistor 17 on one side and a resistor track 14 for a heating resistor 20 on the opposite surface, in each case on the respective prong surfaces. The temperature sensor 15, the compensation resistor 16 and the measuring resistor 17 are disposed on the same side of the substrate 3, while the heating resistor 20 is for instance located on the opposite side. Along the long side 41 located opposite the slit long side of the measuring element 1, five contact faces 21-25 are lined up, mounted spaced apart from one another on the same upper surface of the substrate 3 that also carries the resistor tracks 14 for the temperature sensor 15, compensation resistor 16 and measuring resistor 17. The contact faces 21-25 are connected to the individual resistor tracks 14 via printed conductor tracks 28; specifically, the contact face 21 is connected to the temperature sensor 15, the contact face 22 to the compensation resistor 16 and the measuring resistor 17, the contact face 23 to the measuring resistor 17, and the two contact faces 24, 25 to the heating resistor 20. A conductor track 28 also connects the temperature sensor 15 to the compensation resistor 16, which can be tapped by a contact face 26. The other circuit components of the flow rate meter are connected at the contact faces 21-25 of the measuring element 1 in accordance with the circuit diagram shown in FIG. 1. The series circuit of the temperature sensor 15 and compensation resistor 16, on the one hand, and the measuring resistor 17, on the other, with two resistors 29, 30, is located in a Wheatstone bridge circuit whose bridge diagonal tension is applied to a control amplifier 31 embodied as a differential amplifier. Power supply to the Wheatstone bridge circuit is provided by a direct tension source 34. The output tension $U_A$ of the control amplifier 31 is applied to the heating resistor 20.

The mode of operation of the flow rate meter is known per se and will be briefly described here. The output current of the control amplifier 31 produces heating of the heating resistor 20; the heating output at the heating resistor 20 is determined substantially by the bridge diagonal voltage at the control amplifier 31. The heating resistor 20, which is in good thermal contact with the measuring resistor 17, is thus brought to an excess temperature that is far above the temperature of the flowing medium. If the quantity of the medium flowing past the measuring element 1 now changes, the temperature of the measuring resistor 17 varies as well because of the altered convective heating transfer, and the Wheatstone bridge becomes detuned. The control amplifier 31 thereupon varies the output current for the heating resistor 20. Changes in the measuring resistor 17 as a consequence of an outgoing or incoming amount of heat are always compensated for by changes in the heating output of the heating resistor 20 via the closed control loop, so that the measuring resistor 17 is always kept at a predetermined constant temperature. The heating current or the output voltage $U_A$ of the control amplifier 31 is thus a measure of the mass or flow rate of the flowing medium. Fluctuations in the temperature of the flowing medium are balanced out by the incorporation of the temperature sensor 15 and compensation resistor 16.

Figure 2:
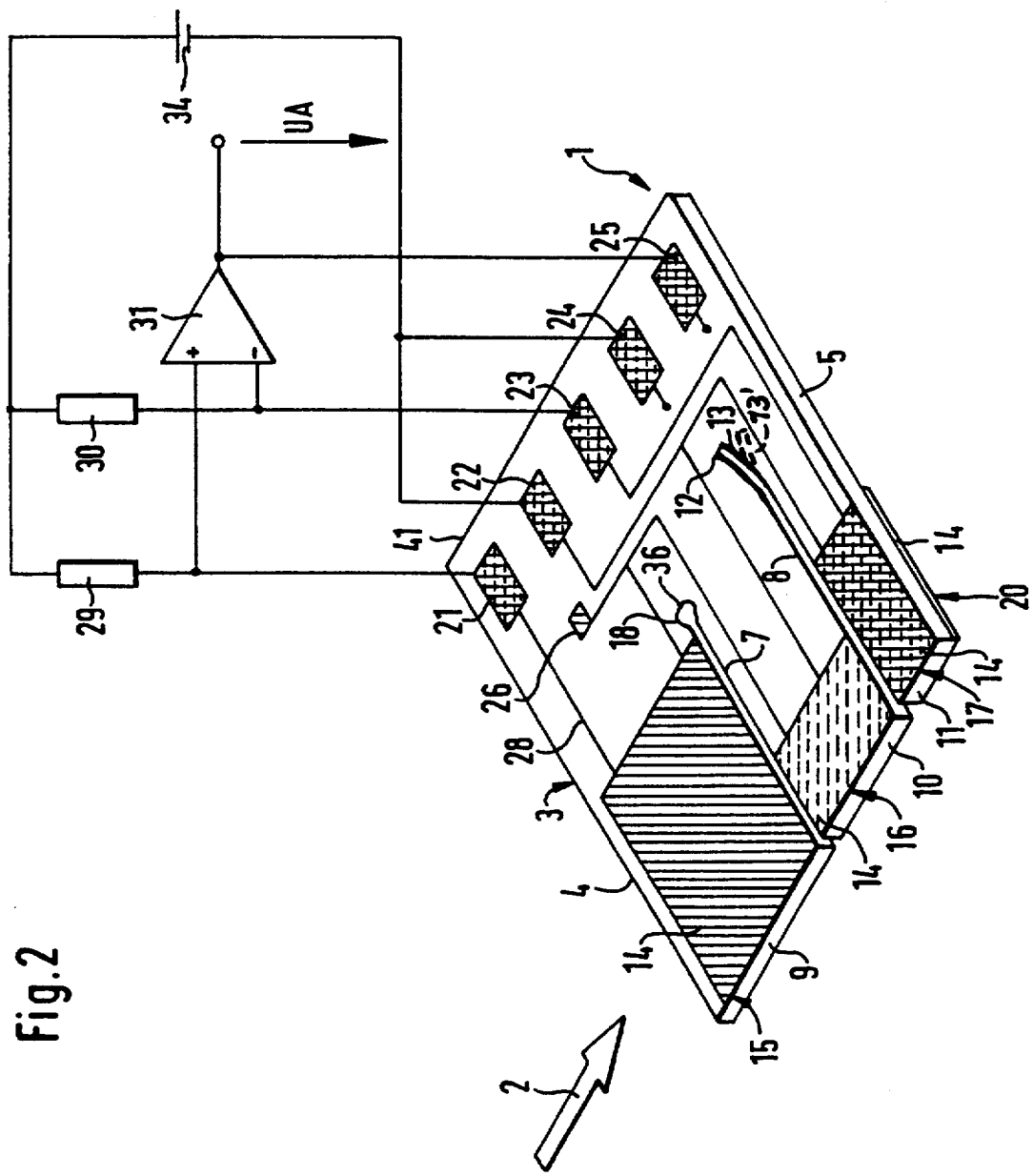
FIG. 2 shows a measuring element embodied in accordance with the invention in the form of a second exemplary embodiment of a flow rate meter.

In a second exemplary embodiment of a flow rate meter shown in FIG. 2 of the drawing, components that are the same and function the same as those in the exemplary embodiment of FIG. 1 carry the same reference numerals. In a departure from the exemplary embodiment of FIG. 1, the separating slit 7 has a lesser length than the separating slit 8, so that the slit end 18 of the separating slit 7 is spaced apart by a greater distance from the long side 41 of the substrate 3 than the slit end 12 of the separating slit 8. As a result of the different length of the separating slits 7, 8, the distance between slit ends 12, 18 is increased, which thus increases the clamping cross section of the middle prong 10 compared with a version with separating slits of equal length; as a result, the mechanical strength of the substrate is increased in the region of the clamping cross section of the middle prong 10. A further effect that increases strength is obtained by embodying the end 18 of the separating slit 7 as an enlargement 36, for example in teardrop form or in some other shape, and by reducing the curvature of the curved course of the segment 13 of the separating slit 8 compared with the exemplary embodiment of FIG. 1.

Unlike what is shown in FIG. 2 of the drawing and described above, a variant of the substrate 3 is for instance possible in which the segment 13 of the separating slit 8 has a curved course pointing away from the separating slit 7, as represented at 13' by dashed lines.

The novel measuring element is especially suitable for determining the flow rate of the aspirated air in mixture-compressing internal combustion engines with externally supplied ignition, or air-compressing, self-ignited engines. As a result of the above-described embodiment of the separating slits according to the invention, increased mechanical strength of the substrate 3 is attained, especially with respect to vibration originating in the engine, and as a result the service life of the measuring element is lengthened.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A measuring element for a device for determining the mass or flow rate of a flowing medium of an aspirated air of internal combustion engines, having a substrate, said substrate has at least one separating slit terminating at a slit end located inside the substrate, the at least one separating slit (7, 8) has a segment (13), beginning at the slit end (12), with a curved course, said segment (13) extends at least partially along the length of said at least one separating slit (7, 8) and lessens tension peaks at said slit end (12), said at least one separating slit (7, 8) forms at least two prongs (9, 10, 11), at least one of said at least two prongs has a resistor track (14) disposed thereon which forms a measuring resistor (17).

2. A measuring element as defined by claim 1, in which at least a first and a second separating skit (7 and 8) are embodied in the substrate (3), said at least first separating slit terminating in a slit end (18) located inside the substrate (3), said at least second separating slit terminating in a slit end (12) located inside the substrate (3), said at least second separating slit (8) has a segment (13) beginning at the slit end (12) that has a course curved toward the at least first separating slit (7), said segment (13) extends at least in part along the length of said at least second separating slit (8).

3. A measuring element as defined by claim 1, in which at least a first and a second separating slit (7 and 8) are embodied in the substrate (3), said at least first separating slit terminating in a slit end (18) located inside the substrate (3), said at least second separating slit terminating in a slit end (12) located inside the substrate (3), and said at least second separating slit (8) has a segment (13') beginning at the slit end (12) that has a course curved away from said at least first separating slit (7), said segment (13') extends at least in part along the length of said at least second separating slit (8).

4. A measuring element as defined by claim 2, in which said at least first separating slit (7) terminates at the slit end (18) in an enlargement opening (36).

5. A measuring element as defined by claim 3, in which said at least first separating slit (7) terminates at the slit end (18) in an enlargement opening (36).

6. A measuring element as defined by claim 2, in which the at least first and the at least second separating slits (7, 8) are of different lengths.

7. A measuring element as defined by claim 3, in which the at least first and the at least second separating slits (7, 8) are of different lengths.

8. A measuring element as defined by claim 3, in which said at least first and said at least second separating slits (7 and 8) are embodied in the substrate (3) and the at least first and the at least second separating slits (7, 8) are of different lengths.

9. A measuring element as defined by claim 4, in which said at least first and said at least second separating slits (7 and 8) are embodied in the substrate (3) and the at least first and the at least second separating slits (7, 8) are of different lengths.

10. A measuring element as defined by claim 5, in which said at least first and said at least second separating slits (7 and 8) are embodied in the substrate (3) and the at least first and the at least second separating slits (7, 8) are of different lengths.

* * * * *